C. A. BLUHM.
TROLLEY.
APPLICATION FILED MAR. 3, 1909.
1,020,794.
Patented Mar. 19, 1912.
3 SHEETS—SHEET 1.
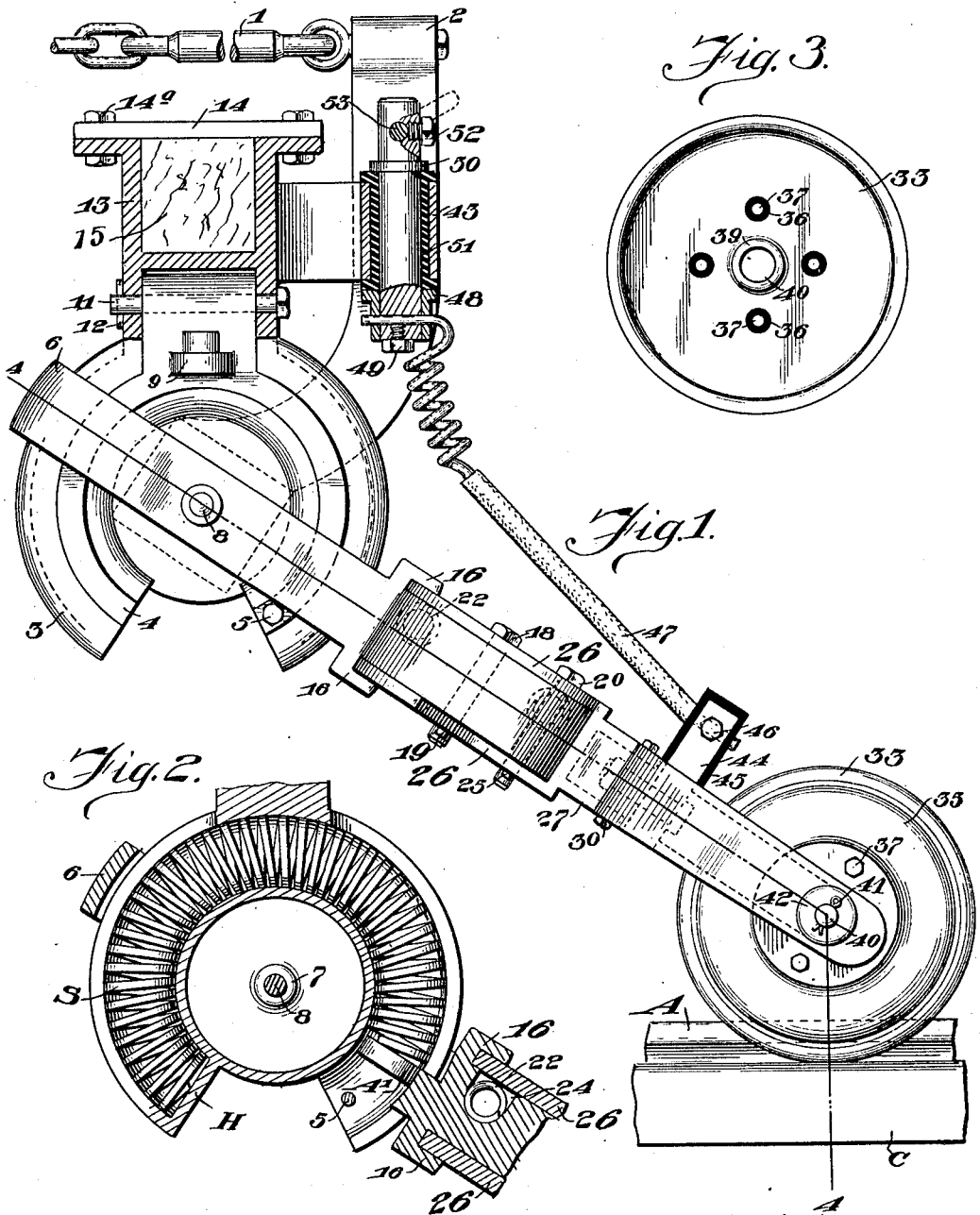

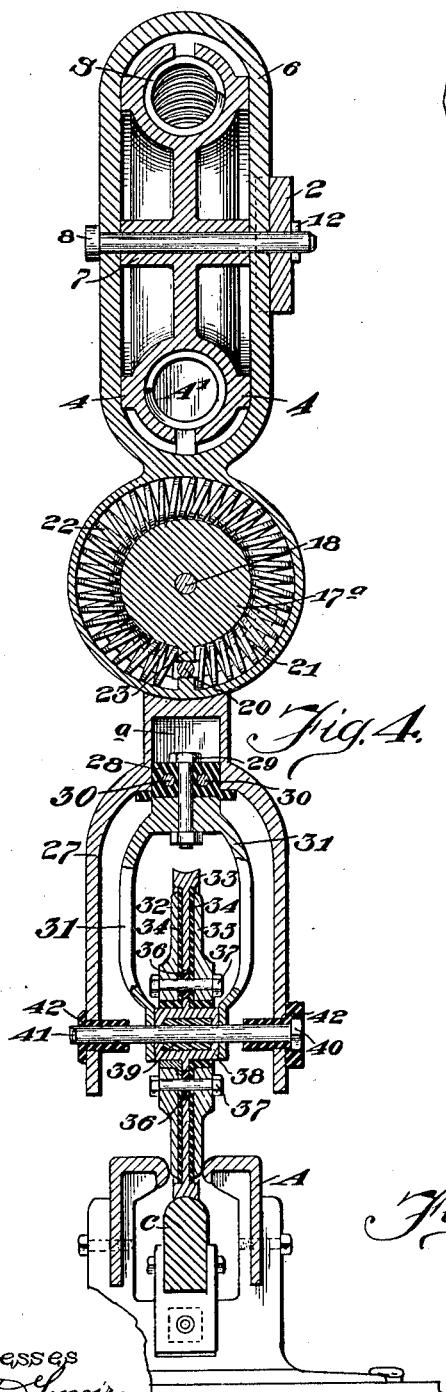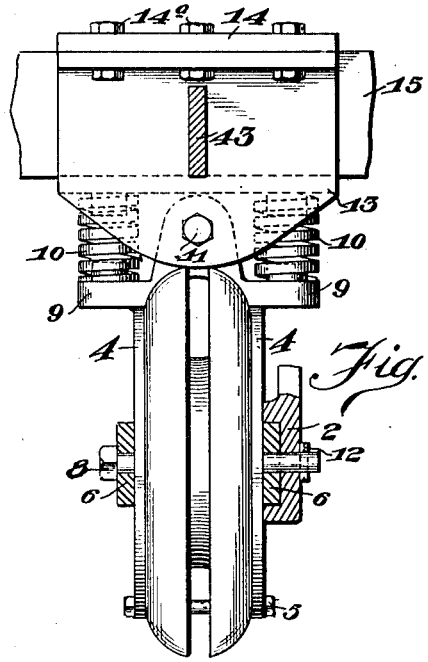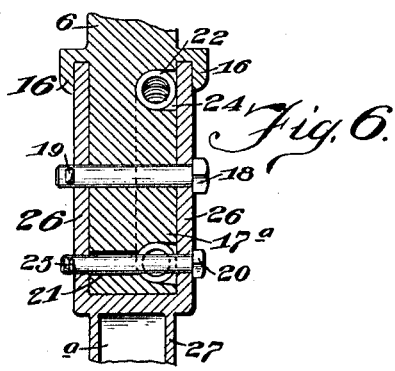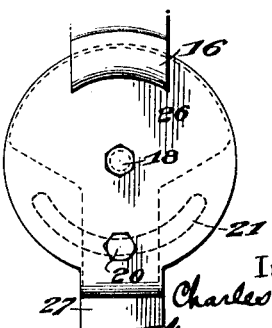

C. A. BLUHM.
TROLLEY.
APPLICATION FILED MAR. 3, 1909.
1,020,794.
Patented Mar. 19, 1912.
3 SHEETS—SHEET 3.
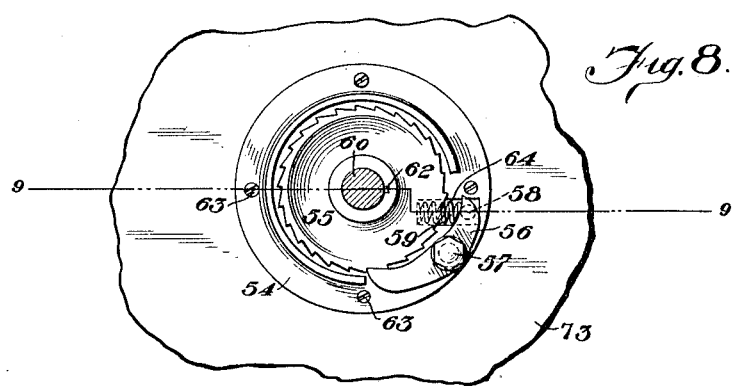
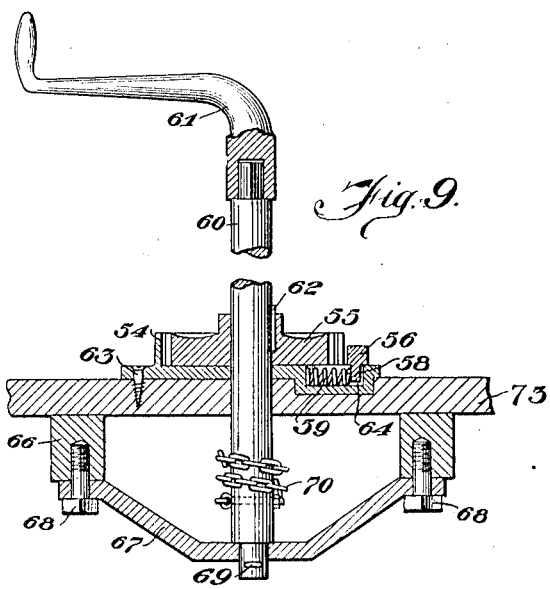
Witnesses
Milton Lenoir
Lloyd W. Patch
Inventor
Charles A. Bluhm
Vernon E. Hodges
Attorney.

UNITED STATES PATENT OFFICE.

CHARLES A. BLUHM, OF MICHIGAN CITY, INDIANA.

TROLLEY.

1,020,794.

Specification of Letters Patent. Patented Mar. 19, 1912.

Application filed March 3, 1909. Serial No. 481,067.

*To all whom it may concern:*

Be it known that I, CHARLES A. BLUHM, a citizen of the United States, residing at Michigan City, in the county of Laporte and State of Indiana, have invented certain new and useful Improvements in Trolleys, of which the following is a specification.

My invention relates to an improvement in trolleys, and has to do more particularly with that type of trolley which is adapted for use in a protected third rail system, which may be used with equal facility on surface roads as well as under-ground or on elevated systems.

Embodied in this invention is a provision whereby the trolley wheel is not only capable of moving up and down but also sidewise and rocking movement as well, thereby relieving the guard rails to a very large degree of the frictional contact on the trolley wheel.

My invention comprises a trolley wheel and a device for lifting the trolley wheel, from the conductor of a third rail, the wheel comprising a rim contact portion adapted to operate in the slot of the guard rails.

The trolley wheel and coöperating parts are held secure to the frame of the car trucks by a support secured thereto by bolts, preferably in the middle, above the third rail, on the inner ends of the car trucks,— one on each truck, for the reason that the trolley wheel is not reversible but stationary upon the frame of the car truck. However, the trolley wheel might be attached to either end of the trucks and under this manner of construction, a lifting device is placed on each platform of the end of the car so that in whatever direction the car is going, the trolley wheel might be brought in contact with the conductor by releasing the ratchet of the releasing device, which acts automatically when lifting the trolley wheel. It may also be so arranged that both trolley wheels can be operated from the same platform of the car. The trolley wheel is held in contact with the conductor by a spring housed in a hollow annular rim provided with a central portion at the supported end of the trolley harp. An extension on the trolley harp projecting into the hollow annular rim, presses against the spring therein when the trolley wheel is raised, and the spring presses it down when the device for lifting it is released. The trolley arm is provided at an intermediate point with an automatic joint in which a spring is housed, whose function it is to restore the arm to its normal straight or approximately straight condition, and yet permit it to yield when resisted. The object of this automatic joint is to facilitate the action of the trolley wheel by keeping it in alinement with the guard rails when turning short curves. In this manner excessive frictional contact of the sides of the trolley wheel against the guard rail is relieved.

To further prevent the trolley wheel from coming into pressed frictional contact with the guard rails, by lateral rocking or by the truck being lower at one side than at the other, due to the elevation in turning curves, and to overcome this objection, springs are mounted upon chairs of the hollow annular rim in connection with the support, the chairs and bottom of the support having lugs to hold the springs in place, the hollow annular rim swinging sidewise upon a bolt that acts as a journal.

The electrical current, when in contact, passes from the conductor of the third rail into the contact rim, to the hub and into the contact springs, then into the conductor wire to the terminal, from the terminal by a conductor wire to the controller, and from the controller the current is conveyed to the motor.

With the foregoing objects in view, this invention consists in certain details of construction in addition to what has been mentioned, which will be hereinafter described more fully and pointed out in the claims.

In the accompanying drawings:—Figure 1 is a side elevation of my improved trolley wheel; Fig. 2 is a view through the center of the hollow annular rim; Fig. 3 is a detail showing the metallic contact rim of the trolley wheel; Fig. 4 is a sectional view on the line 4—4 of Fig. 1; Fig. 5 is a view in front elevation of the hollow cylindrical rim and yoke; Fig. 6 is a fragmentary vertical section through the trolley harp extension and the cylindrical automatic joint; Fig. 7 is a plan view of this joint; Fig. 8 is a plan view of the ratchet mechanism for lifting the trolley; and Fig. 9 is a vertical sectional view on the line 9—9 of Fig. 8.

The trolley harp 27 carries the usual journal 40 at one end, the latter being held in insulating hubs 42, 42 and held in place by means of a split key or cotter 41. The trolley wheel is revolubly supported on this journal 40. This wheel, while capable of being constructed in any approved manner, according to the illustration, comprises the metal disks 32 and 35 a metal contact rim 33 preferably circumferentially grooved at the periphery as illustrated in Fig. 4 to conform to the curvature of the main conductor C, and the hub 38 of which has a graphite bushing 39 interposed between it and the journal 40. The trolley wheel comprises in addition to the two metal face rims 32 and 35, the two insulating disks 34, 34 interposed between the metal face rims and the web of the contact rim, the parts being securely held together by means of bolts 37, 37, which bolts are insulated from the rim 33 by insulating cores 36, 36. Contact springs 31, 31, are located within the harp where they are held by means of a bolt 29 passing through the insulating core 28, which latter is fitted to the bore a of the harp. The core 28 is secured to the harp by bolts 30, 30. The free ends of the springs 31, 31 embrace and are in contact with the opposite ends of the hub 38 of the metal contact rim 33. An automatic joint 17 is formed by an extension of the trolley harp 6 in the shape of a central disk, and the part 27 has an upper extension in the shape of two disks 26, 26, one of which is on each side of the central first-mentioned disk, and the bolt 18 passes through the center of these three disks where it is held by a key or cotter 19. At an intermediate point, the trolley harp has a joint, which will now be explained. A circumferential groove 24 receives the circular spring 22, which bears at its ends against the wall or web 23 of the joint 17. A bolt 20 passes through orifices in the intermediate disk 17ª and the upper and lower plates 26, 26 of the joint, and is adapted to move in a curved slot 21 in the intermediate disk 17ª and this bolt is held in place by the split key or cotter 25. This bolt 20, in its movements sidewise in the slot 21 in the intermediate disk 17ª either one way or the other, presses against the spring 22 in turning corners. The spring 22 is always held to the center by the wall or web 23. The upper end of the trolley harp extension 6 embraces the hollow annular rim 3, being guided in its up and down movements by the curved bearings 4, 4 on the sides of the hollow annular rim 3. The journal 8, which passes through the hub 7 is held by the split key or cotter pin 12, said journal constituting the pivotal connection and center of vertical oscillation of the trolley. This journal 8, not only affords the pivotal support of the trolley but also rigidly secures the harp extension to the lever 2 as shown in Figs. 4 and 5, which lever is the means for lifting the trolley wheel from the third rail through the medium of the connection rod 1.

Housed within the hollow annular rim 3 is a spring S, as shown in Figs. 2 and 4, one end of which spring bears against the rigid head H, against which it is compressed, and the follower-head A' of the trolley harp extension 6 fitted to travel within the hollow annular rim bears against the opposite end of the spring S, whereby to permit the trolley to yield in an upward direction and to maintain the trolley wheel normally in contact with the third rail. A bolt 5 retains the spring S and the follower-head A within the hollow annular rim and forms a stop to limit the downward movement of the trolley wheel. The hollow annular rim 3 is pivotally connected to the support 13 by means of a bolt 11 and the support 13 is clamped to the car truck frame 15 by means of the top plate 14 and bolts 14ª, as shown in Figs. 1 and 5. Stiff springs 10, 10 are mounted on the lugs 9, 9 and bear upwardly against the support 13. In this way the entire trolley is capable of turning axially upon the pin 11 as a center, these springs 10, 10 acting to normally right the trolley when not otherwise resisted. A terminal extension 43 projects outwardly from the support 13 and the terminal 50 is held thereby, an insulating sleeve 51 being interposed between the extension 43 and the terminal 50, as shown in Fig. 1. A flanged collar 48 holds the terminal 50 and the insulating sleeve 51 in place by the conductor wire passing through registering orifices in the collar and terminal, it being held by a binding post or set screw 49. The extension 44 on the contact spring 31 has an insulating hood or cap 45 and a binding or set screw 46 secures the conductor wire 47 to the extension 44, and the upper end of this conductor wire 47 is connected in any approved manner, as for instance, by means of set screw 49 to the lower end of the terminal 50 as above described. A conductor wire 53 is secured to the upper end of the terminal 50 by means of a set screw 52, and this conductor wire leads to the controller (not shown) and from the controller to the motor of an electric car or locomotive (not shown).

A convenient form of lifting means for the trolley is illustrated in Figs. 8 and 9, in which 73 represents a car platform, 54 a cylindrical flanged rim chair of the ratchet wheel, held in place by screws 63, 63, the numeral 55 indicating the ratchet wheel, and 56 the pawl of the ratchet, 59 a coil spring which controls the pawl, 57 the bolt through the pawl, and 58 the lug on the lower side of the pawl against which the spring 59 bears outwardly. Spring 59 is held in a recess 64.

The numeral 60 indicates the lifting rod, having the usual crank 61 at its upper end and having the ratchet wheel 55 held thereon by means of a key 62, and to the lower end of the lifting rod the chain 70, connected with the rod 1, is secured. Beneath the platform 73 are the car sills 66, 66 to which the chair plate 67 is secured by means of screws 68, 68, and in this chair plate 67 the lower end of the lifting rod 60 is stepped, a split key or cotter 69 retaining it therein.

From the foregoing it will be seen that a simple mechanism is provided for operation in connection with a thoroughly insulated and safe third rail; one which may be raised and lowered by the motorman at will, he being able to shut off the current or to turn it on without leaving his position in the car or locomotive. It will also be observed that means is provided for affording perfect freedom and universality of movement of the trolley, thoroughly sensitive to any slight curvature or irregularity encountered by the trolley, especially at curves in the track, one of the special functions of the invention being its provision for movement up or down, sidewise, or rocking motion.

More or less slight deviations within the scope of the appended claims might be made in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. A trolley comprising a support, a hollow annular rim provided with a central portion, a trolley harp and an extension on said harp, a lever connected with the extension, by the aid of which the trolley harp is raised and lowered, said extension and lever pivotally secured to the central portion of the hollow annular rim, and the trolley harp extension guided in its movement up and down by the sides of the rim, the rim having an extension pivotally secured and housed in the support, and a spring housed within the hollow annular rim and pressing against a follower-head of the trolley harp.

2. A trolley comprising a support and a trolley harp pivotally connected to the support, said harp being guided by said support toward and away from the electrical conductor upon which the trolley moves and spring-actuated in one direction, the harp composed of two sections, and a spring joint pivotally connecting said sections together in a plane at right angles to the plane of movement of the trolley harp as a whole, with respect to the support, whereby the trolley is capable of universal movement, namely a rocking movement, up and down, and sidewise.

3. In a trolley the combination with a support and a hollow annular rim provided with a central portion hinged to the support, of a trolley harp pivotally connected with and guided vertically by the hollow annular rim and a spring carried by the hollow annular rim and acting upon the harp.

4. In a trolley the combination with a support and a hollow annular rim provided with a central portion hinged to the support, of a trolley harp pivotally connected with the hollow annular rim, a spring carried by the hollow annular rim and acting upon the harp, a lever secured to the harp and means secured to the lever within the control of the motorman for raising and lowering said trolley harp at will.

5. In a trolley the combination with a support and a hollow annular rim provided with a central portion hinged to the support, of a trolley harp pivotally connected with the hollow annular rim, a spring carried by the hollow annular rim and acting upon the harp, a lever secured to the harp, means within the control of the motorman for raising and lowering said trolley harp at will, said means comprising a lifting rod, a connection extending therefrom to the lever, a crank, and means for automatically locking the lifting rod as it is turned.

6. In a trolley the combination with a suitable support, of a hollow annular rim provided with a central portion hinged thereto, springs for maintaining its normal position, a coil spring housed within the hollow annular rim, a trolley harp pivotally connected to and guided in its movements by the sides of the hollow annular rim and provided with a follower-head, which projects into the hollow annular rim where it is engaged by the spring.

7. In a trolley the combination with a suitable support, of a hollow annular rim provided with a central portion hinged thereto, springs for maintaining its normal position, a coil spring housed within the hollow annular rim, a trolley harp pivotally connected to and guided in its movements by the sides of the hollow annular rim and provided with a follower-head, which projects into the hollow annular rim where it is engaged by the spring, and a stop connected with the hollow annular rim for limiting the movement of the harp in one direction.

8. The combination with a trolley harp, a trolley wheel journaled therein, the harp having a bore in line with the wheel, of a spring, an insulating core secured thereto and inserted in the bore and means for securing the core in the bore of the harp, the spring having an extension, a conductor wire secured to said extension, a terminal carried by the vehicle to which the trolley is attached, means for securing the conductor wire to the terminal and a conductor wire extending from the terminal to the motor to be driven.

9. The combination with a suitable support, of a hollow annular rim provided with a central portion having parallel curved guide flanges on its opposite surfaces, of a trolley harp, an extension on said harp, said extension embracing the hollow annular rim and bearing against the curved guide flanges, whereby to guide its up and down movements, and means for pivotally connecting the extension to the hollow annular rim.

10. The combination with a suitable support, of a hollow annular rim provided with a central portion having parallel curved guide flanges on its opposite surfaces, of a trolley harp, an extension on said harp, said extension embracing the hollow annular rim and bearing against the curved guide flanges, whereby to guide its up and down movements, means for pivotally connecting the extension to the hollow annular rim, and a spring housed within the hollow annular rim and bearing yieldingly upon a portion of the trolley harp extension.

11. The combination with a suitable support having a conductor wire extension, a terminal held in the extension and conductor wires secured to opposite ends of the terminal, of a trolley harp, a trolley wheel, a hollow annular rim provided with a central portion to which the harp is pivotally connected and which hollow annular rim in turn is pivotally connected with the support, a spring carried by the harp in electrical contact with the wheel, and means for connecting one of the conductor wires to said spring.

12. A trolley comprising a support, a hollow annular rim provided with a central portion pivotally connected to the support, said hollow annular rim having lugs, stiff springs mounted on the lugs and bearing upwardly against the support, a trolley harp pivotally supported in the hollow annular rim and provided with a follower-head extending into the hollow annular rim and guided in its vertical movements by said hollow annular rim, and a spring in the hollow annular rim bearing expansibly upon said follower-head, whereby to normally force the trolley harp in the direction of the conductor.

In testimony whereof I affix my signature, in the presence of two witnesses.

CHARLES A. BLUHM.

Witnesses:
HENRY H. BLUHM,
THERON F. MILLER.

Copies of this patent may be obtained for five cents each, by addressing the "Commissioner of Patents, Washington, D. C."